(12) United States Patent
Burbridge et al.

(10) Patent No.: US 7,546,345 B2
(45) Date of Patent: Jun. 9, 2009

(54) METHOD FOR CO-ORDINATING NETWORKED GROUP MEMBERS AND DEVICES PERFORMING THE METHOD

(75) Inventors: Trevor Burbridge, Suffolk (GB); Andrea Soppera, Suffolk (GB); Robert J Briscoe, Suffolk (GB); Arnaud Jacquet, Suffolk (GB)

(73) Assignee: British Telecommunications plc, London (GB)

( * ) Notice: Subject to any disclaimer, the term of this patent is extended or adjusted under 35 U.S.C. 154(b) by 319 days.

(21) Appl. No.: 10/538,122

(22) PCT Filed: Dec. 11, 2003

(86) PCT No.: PCT/GB03/05392

§ 371 (c)(1),
(2), (4) Date: Jun. 7, 2005

(87) PCT Pub. No.: WO2004/059479

PCT Pub. Date: Jul. 15, 2004

(65) Prior Publication Data

US 2006/0075022 A1 Apr. 6, 2006

(30) Foreign Application Priority Data

Dec. 24, 2002 (GB) ................................ 0230169.5

(51) Int. Cl.
*G06F 15/16* (2006.01)
(52) U.S. Cl. ........................ 709/205; 709/203; 709/206
(58) Field of Classification Search ................ 709/205, 709/206, 207, 203
See application file for complete search history.

(56) References Cited

U.S. PATENT DOCUMENTS

| 5,754,845 | A | 5/1998 | White | |
|---|---|---|---|---|
| 6,327,630 | B1 * | 12/2001 | Carroll et al. | 719/314 |
| 7,107,606 | B2 * | 9/2006 | Lee | 725/87 |
| 7,149,215 | B1 * | 12/2006 | He | 370/390 |

(Continued)

FOREIGN PATENT DOCUMENTS

| EP | 1172746 A2 | 1/2002 |
|---|---|---|
| EP | 1172746 A3 | 7/2003 |
| JP | 2002344919 | 5/2001 |

OTHER PUBLICATIONS

Fenner et al., "Multicast Source Notification of Interest Protocol (MSNIP)", internet articale, Online, Nov. 21, 2001, pp. 1-22, XP002276922, ( http://www.ietf.org/proceedings/02mar/1-D/draft-idmr-msnip-01.txt).*

(Continued)

*Primary Examiner*—Duc Nguyen
*Assistant Examiner*—Adel Youssef
(74) *Attorney, Agent, or Firm*—Nixon & Vanderhye PC

(57) ABSTRACT

A network channel is used as a waiting channel, wherein members of a group other than a first member join the waiting channel while performing an action or process, and then leave the waiting channel once the action or process has been performed. Once all of the members have left the waiting channel the first member of the group then performs an action or process. In order to indicate to the first member that all of the other members have left the waiting channel, a protocol such as the Multicast Source Notification of Interest Protocol (MSNIP) may be used.

16 Claims, 8 Drawing Sheets

U.S. PATENT DOCUMENTS

2002/0059587 A1* 5/2002 Cofano et al. .................. 725/35
2002/0081995 A1* 6/2002 Leppinen et al. ............ 455/412
2005/0007990 A1* 1/2005 Beckmann et al. .......... 370/349

OTHER PUBLICATIONS

Widmer et al., "Extremum Feedback for Very Large Multicast Groups", pp. 1-12 circa 2001.

Jayasimha et al, "A Foundation for Designing Deadlock-Free Routing Algorithms in Wormhole Networks", pp. 1-8 circa 1996.

Fenner et al., "Multicast Source Notification of Interest Protocol (MSNIP)", Internet Article, 'Online!, Nov. 21, 2001, pp. 1-22, XP002276922.

Handley et al., "Session Announcement Protocol (RFC 2974)", Internet Article, Oct. 2000, XP002187917.

International Search Report—Apr. 14, 2004.

* cited by examiner

METHOD FOR CO-ORDINATING NETWORKED GROUP MEMBERS AND DEVICES PERFORMING THE METHOD

This application is the US national phase of international application PCT/GB2003/005392 filed 11 Dec. 2003 which designated the U.S. and claims benefit of GB 0230169.5, dated 24 Dec. 2002, the entire content of which is hereby incorporated by reference.

BACKGROUND

1. Technical Field

The present invention relates to a method for co-ordinating the actions of a group of users, applications, or devices who communicate via a network, and to devices which are capable of performing such a method.

2. Related Art

With this invention the general problem that we are trying to solve is that of coordination between different numbers of receivers, or alternatively, if we describe the problem as a temporal process model then the problem becomes the coordination of different activities that participate in the achievement of a final objective.

In general the technical literature available in the art shows a distinct lack of solutions to control and coordinate a large population of networked devices. Network scenarios where a sender is able to contact a large number of receivers using a single communication channel are known, and in general the protocol used to achieve this goal is IP-Multicast, although in the last few years other interesting application layer solutions have also been developed. A transport protocol exploiting either IP multicast or other group communication techniques provides a very important benefit allowing the sender to send a message to multiple receivers using a single local transmit operation. Another important aspect of these techniques is that no messages are sent back from receivers to the server, so the server is not overloaded and in general no information relating to the receivers is maintained on the sender side. Such features are fine provided that no coordination of the senders and receivers is required, but once such co-ordination becomes necessary then the existing group communication techniques face problems.

Within the prior art such problems have been addressed as a session announcement problem, and the Session Announcement Protocol (SAP) proposes this approach. SAP (described by Mark Handley et al. *SAP: Session Announcement Protocol*, IETF work in progress, June 1999) is a straightforward protocol where a session creator multicasts packets periodically to a well-known multicast group carrying an SDP (Session Description Protocol) description of the session. Receivers that want to know which session is going to be active then listen to a well-known multicast channel and receive the packets.

As an alternative to SAP, BT Exact Technologies have developed a Generic Announcement Protocol that is more scalable and powerful than SAP and is capable of announcing different sessions at the same time thanks to the data structure that it exploits. GAP is described fully in International Patent application no PCT/GB01/02681, to which the reader is referred. However neither of these protocols are able to guarantee coordination between different users since they do not provide any feedback channel. In this respect, information directed from the receiver to the sender is usually known as feedback. Several existing techniques of feedback are known in the art, discussed next.

Within the art it is possible to find several implementations of feedback in group communications, most of which exist in the context of reliable multicast in order to improve reliability of group communication scheme. For examples see J. Nonnenmacher and E. W. Biersack. Scalable feedback for large groups. IEEE/ACM Transactions on Networking 1999; FUHRMANN, T., AND WIDMER, J. *On the scaling of feedback algorithms for very large multicast groups*. Computer Communications 24, 5-6 (March 2001), 539 547; and WIDMER, J., AND FUHRMANN, T. *Extremum feedback for very large multicast groups*. Tech. Rep. TR 12-2001, Prakfische Informatik IV, University of Mannheim, Germany, May 2001. The main challenge of these mechanisms is to deal with very large and variable sets of population so as to alleviate the problem of implosion on the interface or on the server that is requesting feedback. Feedback methods generally exist in two forms: end-to-end feedback methods and aggregated feedback.

End-to-end feedback protocols avoid feedback implosion by estimating the dimension of the population. One of the main important pieces of prior art provides a probabilistic model and shows that feedback implosion could be mitigated using appropriate probabilistic functions.

Aggregate feedback mechanisms are specific methods to elaborate more specific feedback. In this case intermediate receivers organized in a hierarchy structure construct the feedback. The complexity of the scheme is higher but the sampled value could be more accurate.

Moreover, the co-ordination of large groups exploiting group communication protocols may also be performed with an aggregate feedback mechanism and more specifically an extremum feedback algorithm that could avoid overloading the sender with useless messages. Such an algorithm is described by Widmer et al. referenced above. However with such an algorithm an initiator may have to spend a lot of resources in terms of bandwidth and cpu processor time. Furthermore the technique can only give an overall sample of the population because of its statistical nature and network reliability problems.

There is therefore still a need to provide for coordinated group communications or actions via a network which is not resource-intensive, and which provides for positive co-ordination of groups.

SUMMARY

In order to address the above the present exemplary embodiment provides the concept of a network channel which is used as a waiting channel, wherein members of a group other than a first member join the waiting channel whilst performing an action or process, and then leave the waiting channel once the action or process has been performed. Once all of the members have left the waiting channel the first member of the group then performs an action or process.

In view of the above, from a first aspect the invention provides a method for co-ordinating a group of members, the group comprising a first member and one or more other members, each member being arranged to communicate with the other members of the group via a network, the method comprising, at the first one of said group members, the steps of:

monitoring a waiting channel for messages indicating that at least one of the one or more other members are joined to the waiting channel; and when the messages indicate that all of the other members have left the waiting channel, performing an action or process The invention according to the first aspect provides the distinct advantage that synchronisation can be achieved between the members of the group, and in particular between the first member and the other members, such that the first member does not perform its action or process until all of the other members have left the waiting channel. The point to note, however, is that whilst the other members are joined to the waiting channel they themselves may be performing their own respective actions or processes, and hence the cumulative effect of the use of the waiting channel is to synchronise the respective actions or processes performed by the various members such that they occur at the appropriate times and in the correct order. Such synchronisation and control is envisaged as being of great use in various scenarios including multimedia conferencing, supply chain management, project management, and distributed processing.

In a preferred embodiment, the action or process to be performed preferably comprises transmitting data onto one or more other channels, and preferably at least one of the one or more other channels is a multicast channel. Such features lend the invention well to the provision of synchronic conferencing services.

Moreover, within such a preferred embodiment the data is preferably audio and/or video data. Hence multimedia conferencing can be synchronised and controlled using the invention.

In other embodiments the action or process is to perform a predetermined task, which may be anything dependent upon the particular application of the invention. For example, when used in a distributed computing application the predetermined task may be to execute a particular program to process a particular piece of data, the processing being dependent upon the completion of other processes by other group members. Alternatively, when used in a project management application the predetermined task may be to design or manufacture a particular component required for whatever the project relates to.

In the case of there being a plurality of other members the waiting channel is preferably a multicast channel. This allows a large number of other members to join the waiting channel without imposing significant signalling overheads on the network.

Moreover, within the preferred embodiment the messages are generated by a network router. Thus it is the network which bears the load of generating the messages indicating the waiting channel membership to the first member. This provides the advantage that the first member does not need to store the state of every other member of the group, and hence allows for increased scalability up to a large number of group members.

Additionally, within the preferred embodiment the messages are preferably Multicast Source Notification of Interest Protocol (MSNIP) messages. Such a protocol provides the advantages of simplicity and low network overheads for its implementation, there being relatively few messages required by such a protocol.

Furthermore, the method preferably further comprises the steps of announcing which channel is the waiting channel to the one or more other members. This allows the first member to choose a network channel to act as the designated waiting channel. In other embodiments a dedicated waiting channel announcer application may be provided to announce the waiting channel to the group members.

From a second aspect the present invention also provides a method for co-ordinating a group of members, the group comprising a first member and one or more other members, each member being arranged to communicate with the other members of the group via a network, the method comprising, at one or more of said other members, the steps of:

joining a waiting channel relating to an action or process to be performed by the first member;

performing an action or process at the one or more of said other members; and then leaving the waiting channel.

In the second aspect various further features and advantages may be obtained as already described in respect of the first aspect.

From a third aspect the present invention also provides a device arranged to co-ordinate with one or more other devices, each device being arranged to communicate via a network, the device comprising:

channel monitoring means arranged in use to monitor a waiting channel for messages indicating that at least one of the one or more others of said devices are joined to the waiting channel; and means for performing an action or process so arranged such that when the messages indicate that all of the other devices have left the waiting channel the means performs said action or process.

Moreover, from a fourth aspect there is also provided a device arranged to co-ordinate with another device, each device being arranged to communicate via a network, the device comprising:

channel joining means arranged in use to join a waiting channel relating to an action or process to be performed by the first device;

means for performing an action or process; and channel leaving means arranged in use to leave the waiting channel.

Within both the third and fourth aspects corresponding further features as already described in respect of the first and second aspects may further be provided.

From a fifth aspect the invention further provides a computer program or suite of programs so arranged such that when executed by a computer system the program or programs cause the computer system to operate according to the method of any of the first or second aspects.

Additionally, from a sixth aspect there is provided a computer-readable storage medium or media storing a computer program or suite of programs according to the fifth aspect. The storage medium or media may be any computer storage medium known in the art, and including but not limited to magnetic storage media, optical storage media, magneto-optical storage media, and solid-state storage media.

From a seventh aspect the invention further provides a network channel when used as a waiting channel, wherein members of a group other than a first member join the waiting channel whilst performing an action or process, and then leave the waiting channel once the action or process has been performed, wherein the first member of the group then performs an action or process. Such a network channel facilitates the earlier aspects of the invention as previously described.

Moreover, from an eighth aspect the invention also provides a method of group co-ordination using a network, wherein members of a group other than a first member join a network channel designated as a waiting channel whilst performing an action or process, and then leave the waiting channel once the action or process has been performed, wherein the first member of the group then performs an action or process. Within the eighth aspect the same advantages and further features may be obtained as previously described in respect of the first aspect.

BRIEF DESCRIPTION OF THE DRAWINGS

Further features and advantages will become apparent from the following description of preferred embodiments of the invention, presented by way of example only, and by reference to the accompanying drawings, wherein like reference numerals refer to like parts, and wherein.

DETAILED DESCRIPTION OF EXEMPLARY EMBODIMENTS

Figure 1:
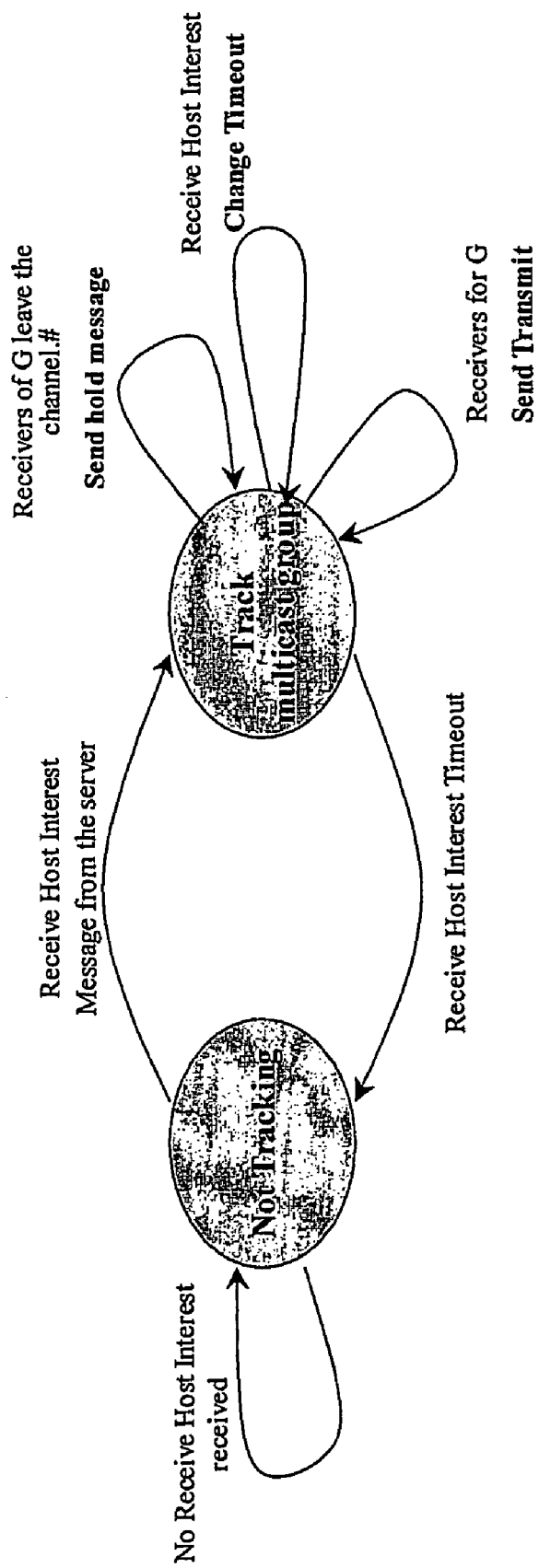
FIG. 1 is a state machine diagram for a state machine at a router implementing MSNIP.

Several embodiments of the invention will now be described, but each of which make use of common elements. In particular the embodiments to be described each make use of multicast data channels within a network, may each be implemented on general purpose computer systems, and each preferably although not exclusively make use of a known signalling protocol known as the Multicast Source Notification of Interest Protocol (MSNIP). As such these three common elements will be described in detail next.

Discussing MSNIP first, a draft internet standard describing MSNIP was submitted to the Internet Engineering Task Force (IETF) in March 2002. Documents describing MSNIP are B. Fenner, H. Holbrook, and I. Kouvelas, "*Multicast source notification of interest protocol (msnip)*", Internet Engineering Task Force (IETF), draft-ietf-idmr-msnip-*.txt, February 2001; and Haixiang He, INTERNET-DRAFT, Nortel Networks, MSNIP Extension for IGMP Proxying, the details of which necessary for understanding the present invention being incorporated herein by reference. However a brief outline of the operation of MSNIP will be given next with respect to FIG. 1.

MSNIP is an extension of the Internet Group Membership Protocol IGMPv3 protocol (as described by B. Cain, S Deering, W. Fenner, I Kouvelas, A. Thyagarajan in "*Internet Group Management Protocol, Version 3*", Internet Engineering Task Force (IETF), draft-ietf-idmr-igmp-v3-*.txt, January 2002), to provide group membership notification services. MSNIP operates between a multicast source and its first-hop router to provide information on the presence of receivers on a multicast channel provided by the source. In particular the router passes messages to the source to signal whether there are no receivers joined to the multicast channel, or whether there are one or more receivers joined to the channel. The intended use is then that the multicast source holds off on any transmission onto the channel until the first router signals the presence of >=1 receivers, thus saving network bandwidth between the source and the first-hop router. In the absence of such signalling the source would have no knowledge of the channel membership, and hence would send to the first-hop router, where the packets would then be discarded for no interest.

MSNIP has been presented to the IETF in the Multicast & Anycast Group Membership (magma) for use with applications such as video and radio servers that can send a large amount of packets through the first hop. These servers therefore waste a lot of network resources if there is no interest from receivers. MSNIP provides the ability to prevent multicast sources from transmitting packets onto their first-hop link when there are no receivers.

MSNIP is compatible with protocol such as SSM (single source multicast), and also supports sparse-mode multicast routing protocols that build source-specific trees. With MSNIP the first router holds information about the state of receivers. The protocol further uses just three signalling messages: (1) group map, (2) interest solicitation and (3) receiver membership report. The uses of these messages are discussed next.

Firstly when an application (source) wants to use a MSNIP managed group channel, the application must first listen for Group Map Messages, which contain the multicast channels managed by MSNIP. Hence Group Map Messages contain information regarding the available multicast channels onto which a source application may transmit.

Next in order to determine whether or not a channel has any receivers joined thereto (i.e. whether any receivers are listening to the channel), a source application that is about to send data to a group managed by MSNIP first periodically multicasts to all the IGMP routers (224.0.0.2) an Interest Solicitation Message. Thus Interest Solicitation Messages indicate to the IGMP routers that a source is interested to learn whether or not there is receiver interest on the particular channel.

Finally, the IGMP router(s) responds to an Interest Solicitation message with a Receiver Membership Report (RM). This message contains information about the transmission of data and instructs a source to start or stop sending traffic to the specified group address. In particular an RM indicates to a source application that there is at least one receiver joined to the multicast channel, and hence that the source may start transmitting.

FIG. 1 illustrates the state machine at a router used to control the router to perform MSNIP, and further shows that a router's first function is to listen within a "Not Tracking" state to a multicast channel for "Receive Host Interest" messages from a server indicating that a receiver has joined the multicast channel. Once such messages have been received the multicast router enters the "Track Multicast Group" state, and will send a RM report message containing either "hold" or "transmit" instructions to the source of the specific group, dependent upon the group interest level. Particularly, when there are one or more receivers joined to the group channel then a "transmit" message is sent to a source application which has previously sent an Interest Solicitation message to the routers regarding the channel. However if all of the receivers leave the multicast channel then the router sends a "hold" message to the source application to stop transmitting over the first hop. Finally, if once there are no receivers joined to the multicast channel and no Receive Host Interest message is received at the server within a given timeout period, then the router leaves the tracking state and returns to the first "Not Tracking" state.

MSNIP is a very important but simple protocol and MSNIP IPv4 specifications have been submitted as a proposed standard by the IETF in March 2002, as mentioned earlier. However whilst MSNIP provides a convenient signalling protocol for use with the invention it should be understood that the invention is not limited to the exclusive use of MSNIP, and that application layer signalling protocols which provide similar functionality may also be used if required. This is of particular importance given the long and uncertain standardisation process.

Turning now to the hardware which is required by the invention, as mentioned earlier the source applications which would incorporate or make use of the present invention may be run on general purpose computer systems, similar to those described next with reference to FIGS. 2 and 3.

Figure 2:
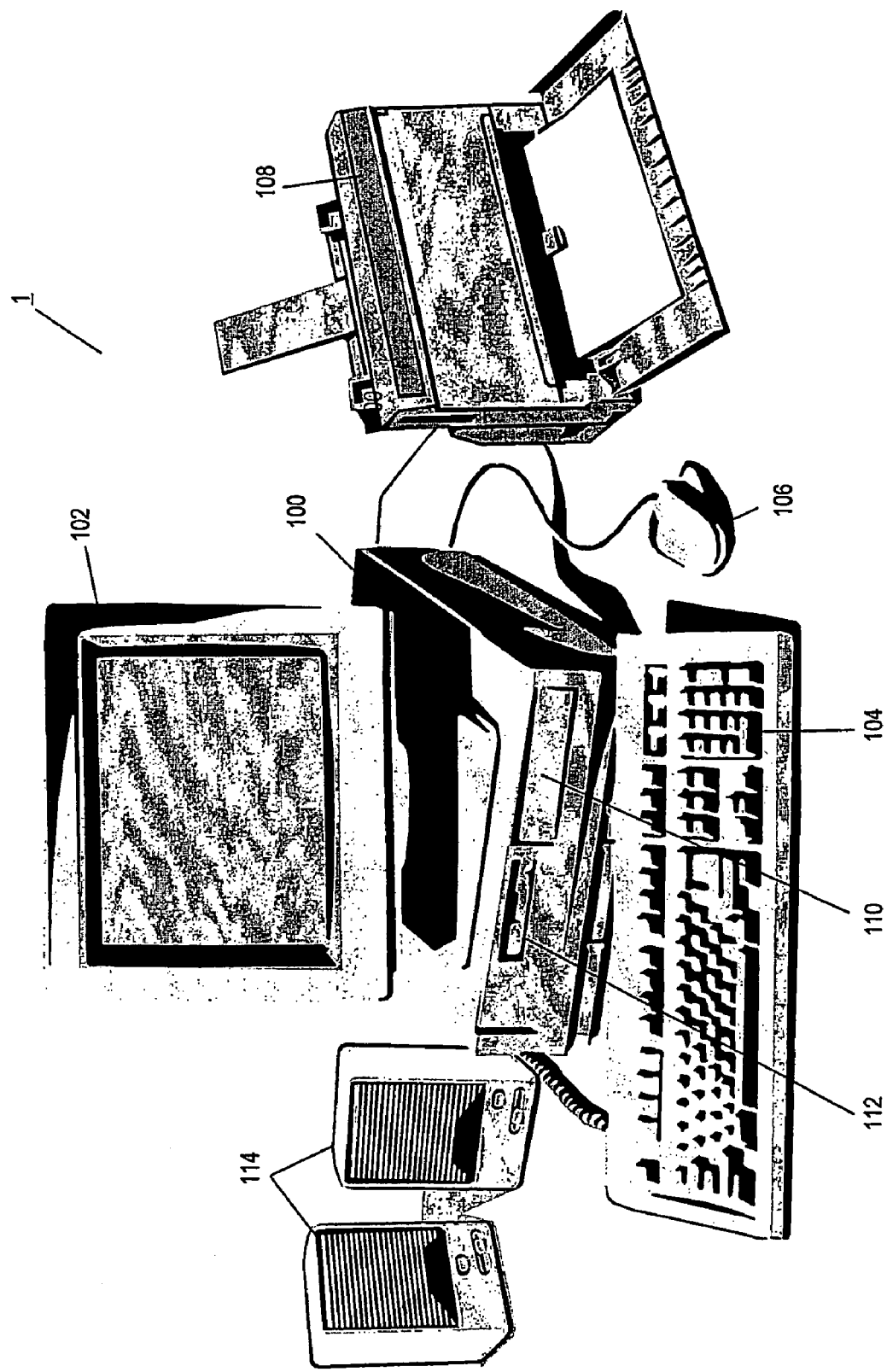
FIG. 2 is a picture of a computer system which may form an embodiment of the invention.

FIG. 2 illustrates a general purpose computer system which provides one possible operating environment for source applications used in the embodiment of the present invention. Later, the operation of the invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that the invention may be embodied within other computer systems other than those shown in FIG. 2, and in particular hand held devices, notebook computers, main frame computers, mini computers, multi processor systems, distributed systems, etc. Within a distributed computing environment, multiple computer systems may be connected to a communications network and individual program modules of the invention may be distributed amongst the computer systems. In particular we also envisage the invention being embodied within computers mounted in sensor devices.

With specific reference to FIG. 2, a general purpose computer system 1 which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 2 illustrates an exemplary embodiment only, and that other configurations of computer systems are possible which can be used with the present invention. In particular, the base chassis unit 100 may be in a tower configuration, or alternatively the computer system 1 may be portable in that it is embodied in a lap-top or notebook configuration. Other configurations such as personal digital assistants or even mobile phones may also be possible.

Figure 3:
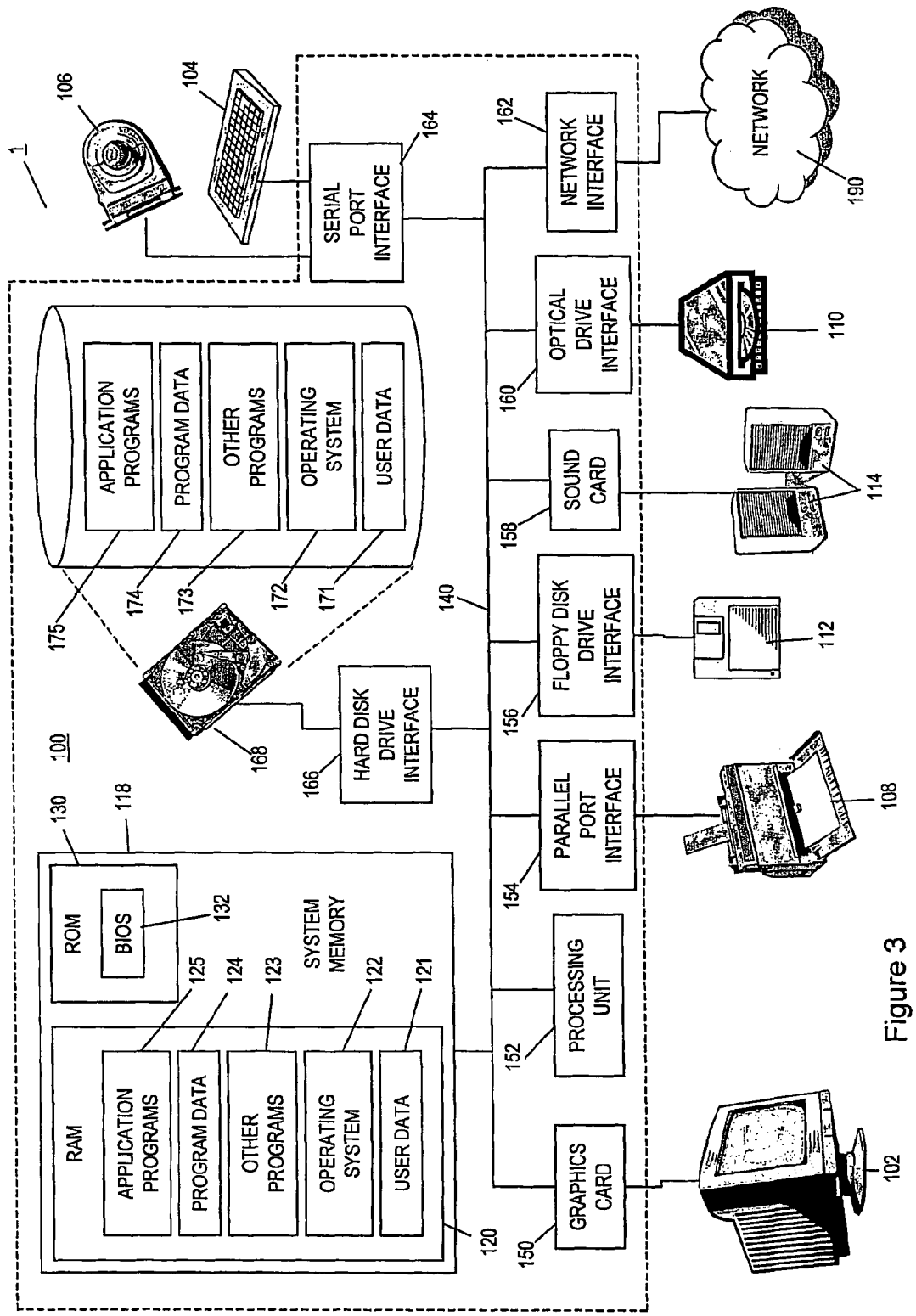
FIG. 3 is an system architecture block diagram of a computer system.

FIG. 3 illustrates a system block diagram of the system components of the computer system 1. Those system components located within the dotted lines are those which would normally be found within the chassis unit 100.

With reference to FIG. 3, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. The network 190 may be a local area network, wide area network, local wireless network, or the like. In particular, IEEE 802.11 wireless LAN networks may be of particular use to allow for mobility of the computer system. The network interface 162 allows the computer system 1 to form logical connections over the network 190 with other computer systems such as servers, routers, or peer-level computers, for the exchange of programs or data. Within the embodiments IP multicast connections are particularly used.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 3 illustrates one embodiment of the invention, it will be understood by the skilled man that other peripheral devices may be attached to the computer system, such as, for example, microphones, joysticks, game pads, scanners, or the like. In addition, with respect to the network interface 162, we have previously described how this is preferably a network card, although equally it should also be understood that the computer system 1 may be provided with a modem attached to either of the serial port interface 164 or the parallel port interface 154, and which is arranged to form logical connections from the computer system 1 to other computers via the public switched telephone network (PSTN).

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

Figure 4:
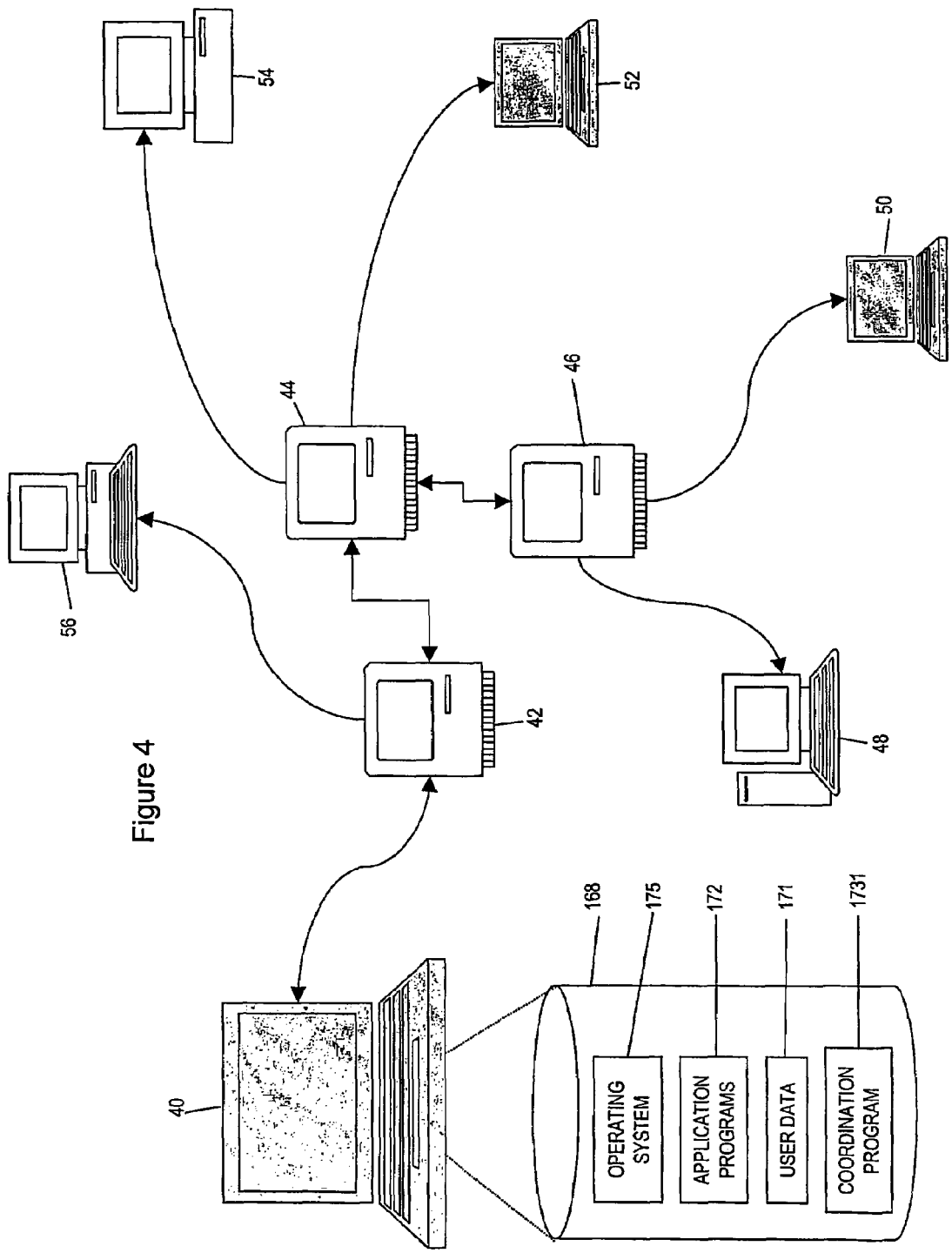
FIG. 4 is a block diagram showing an example multicast channel used in the embodiments of the invention.

FIG. 4 illustrates an example of how a plurality of general purpose computer systems running a source application and receiver applications respectively as appropriate can be connected via one or more IGMP routers to form a multicast channel. In particular a source application is run on computer 40 which generally conforms to the general purpose computer system previously described, and which is provided with a hard disk 168, having operating system software 175, application programs 172, and user data 171 stored thereon. In addition, the hard disk also stores a co-ordination program 1731, which when executed controls the computer to act in accordance with the invention, and in particular to allow co-ordination of the computer 40 with the other computers to be described.

The computer 40 is connectable via a logical connection over a network to a first IGMP router 42, which is the first-hop router for the computer 40. By way of example additional IGMP routers 44 and 46 are also provided as part of the network, with router 44 being connected to router 42, and router 46 being connected to router 44. Of course, within a real embodiment as many interconnected routers as are required may be provided.

Connectable to the IGMP routers are other general purpose computer systems 48, 50, 52, 54, and 56, each of which may have the architecture previously described with respect to FIGS. 2 and 3. More particularly computer 48 is connectable to router 48, as is also computer 50. Router 44 has connectable thereto the computers 52 and 54, whereas router 42 has computer 56 connectable thereto. All of the computers 48 to 56 are provided with computer readable storage media in the form of at least a respective hard disk drive 168, having stored thereon operating system software 175, application programs 172, and user data 171. In addition, the respective hard disks also store respective co-ordination programs 1731, which when executed control the respective computers to act in accordance with the invention, and in particular to allow co-ordination of the computers 48 to 56 with the computer 40 as will be described. In this respect each of the computers 48 to 56 have stored a receiver application program which is executed to receive data from the source application on the computer 40 via the multicast channel formed by the IGMP routers.

With respect to the multicast channels used within the invention, assuming in this example that the network comprises the three routers 42, 44, and 46, serving the computers 40, and 48 to 56, then a multicast channel from a source application on the computer 40 to the receiver applications running on the other computers may be formed as follows.

Firstly, the computer 40 running the source application connects to the first-hop router 42, and sends data packets thereto. Also connected to the first-hop router 42 is one of the other computers 56 running a receiver application, and when this computer is joined to the multicast channel the router 42 routes copies of the data packets received from the source computer 40 thereto. Additionally, when any of the other computers 48, 50, 52, and 54 are joined to the multicast channel, the first-hop router 42 also routes copies of the packets to the second-hop router 44. Connected to the second hop router 44 are the computers 54 and 52, each of which are running receiver applications. When these computers are joined to the multicast channel in question the second-hop router 44 routes copies of the packets received from the first-hop router to the computers 52 and 54. Additionally, when either of the computers 48 and 50 are respectively joined to the channel via the third-hop router 46 the second-hop router also routes copies of the data packets to the third hop router 46. At the third hop router 46 the data packets received from the second-hop router are then respectively routed to the computers 48 and 50.

Within the embodiments the invention provides methods and devices that allows several independent users to be synchronized. It is particularly efficient within a large network scenario, where large numbers of users require co-ordination. The embodiments require that users who are members of groups are able to communicate between each other exploiting one or more group communication channels over a network, including but not limited to multicast.

The general operation of the embodiments of the invention to be described is that at least one of the available channels is managed using a protocol either similar to, or in fact using, MSNIP, and is designated as a "waiting channel" which is used to synchronise and co-ordinate actions between a source and one or more receivers. More particularly, by monitoring RM reports generated in accordance with MSNIP (or a similar interest notification protocol) a source is able to distinguish whether at least one receiver is connected to the specific channel, designated as the waiting channel, and is then able to perform a process or take some other action in response to an indication from the IGMP routers in accordance with the notification of interest protocol that there is at least one receiver joined to the channel, or that all of the receivers have left the channel. For co-ordination purposes the latter condition is preferred, as this indicates that all of the receivers have left the channel, and it can be arranged in advance that leaving the channel presents some significance i.e. the act of leaving communicates some information to the source.

Within the specific embodiments to be described next we use MSNIP as the notification of interest protocol. However, as should be apparent from the foregoing discussion the invention is not limited to the sole use of MSNIP, and other notification of interest protocols which provide similar functionality may be substituted into the embodiments, and hence are intended to be encompassed by the present invention.

As an example of the above described operation, we now consider a first embodiment, which will be described with reference to FIGS. 5 and 6.

Within the first embodiment we virtually divide the available communications channels into two sets: waiting channels and main channels. Here, a receiver joins a waiting channel whilst waiting an action to start on an action channel, and then leaves the channel to join the action channel when the receiver is ready for the action to start—in other words leaving a waiting channel triggers an action on an action channel. As a result the waiting and action state is only dynamically associated, and it is possible that an action channel once triggered may then serve in turn as a waiting channel for another action channel. It is important to notice that the terms action channel is not directly associated with a communication channel, it could even be a simple action performed exploiting this mechanism.

As an example of the above, as the first embodiment consider a multicast video transmission to be transmitted from a source. Here, the source announces in advance a multicast channel onto which the video data will be transmit, and also an MSNIP managed multicast waiting channel related to the transmission. Upon hearing the announcement interested receivers join the waiting channel, and then prepare themselves to receive the video transmission whilst still joined to the waiting channel. Once each receiver is prepared it then joins the multicast channel onto which the video data will be transmit, and leaves the waiting channel. Once all of the receivers have left the waiting channel the source is sent an MSNIP "hold" message, which indicates to the source that all of the interested receivers have left the waiting channel and hence should be joined to and ready to receive data on the multicast video channel. Hence the source can then transmit sure in the knowledge that co-ordination between the receivers and the source has been achieved.

Figure 5:
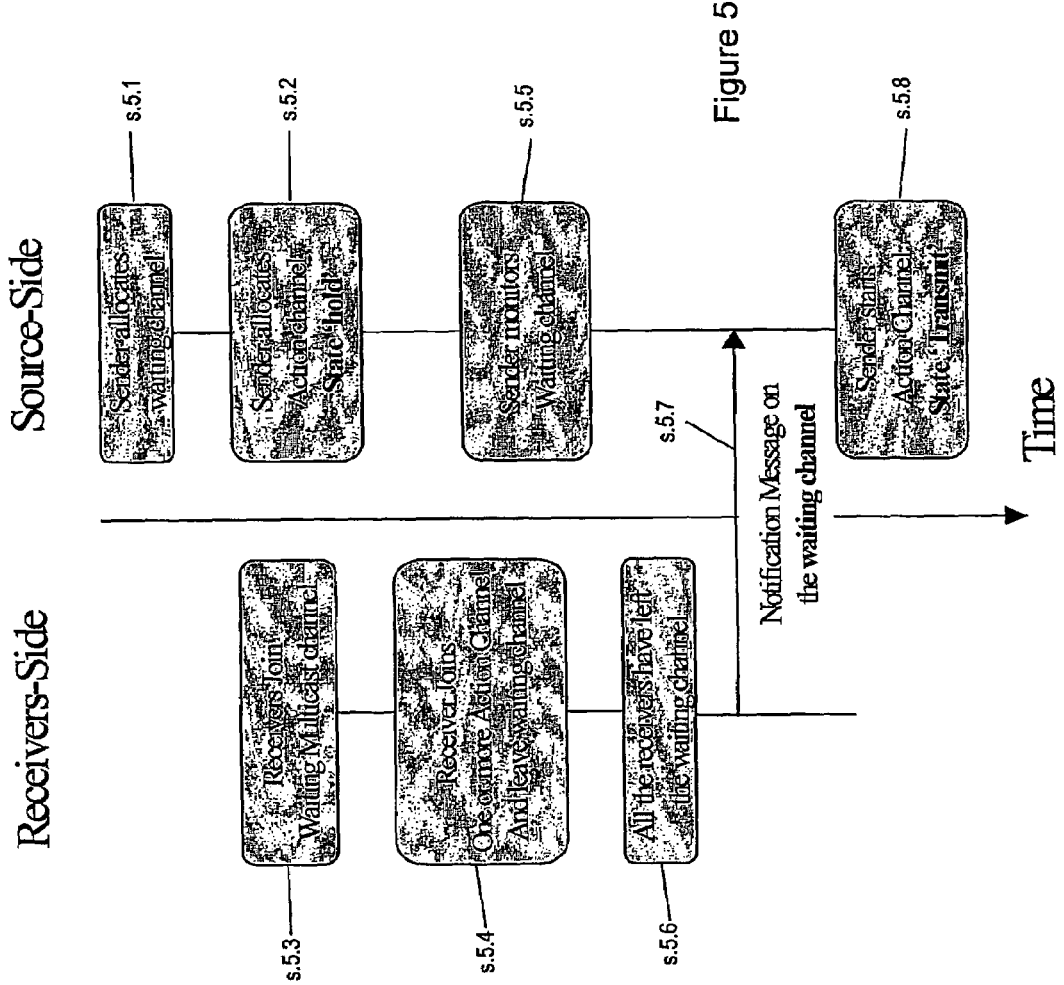
FIG. 5 is a flow diagram illustrating the actions performed by receivers and a source in an embodiment of the invention.
Figure 6:
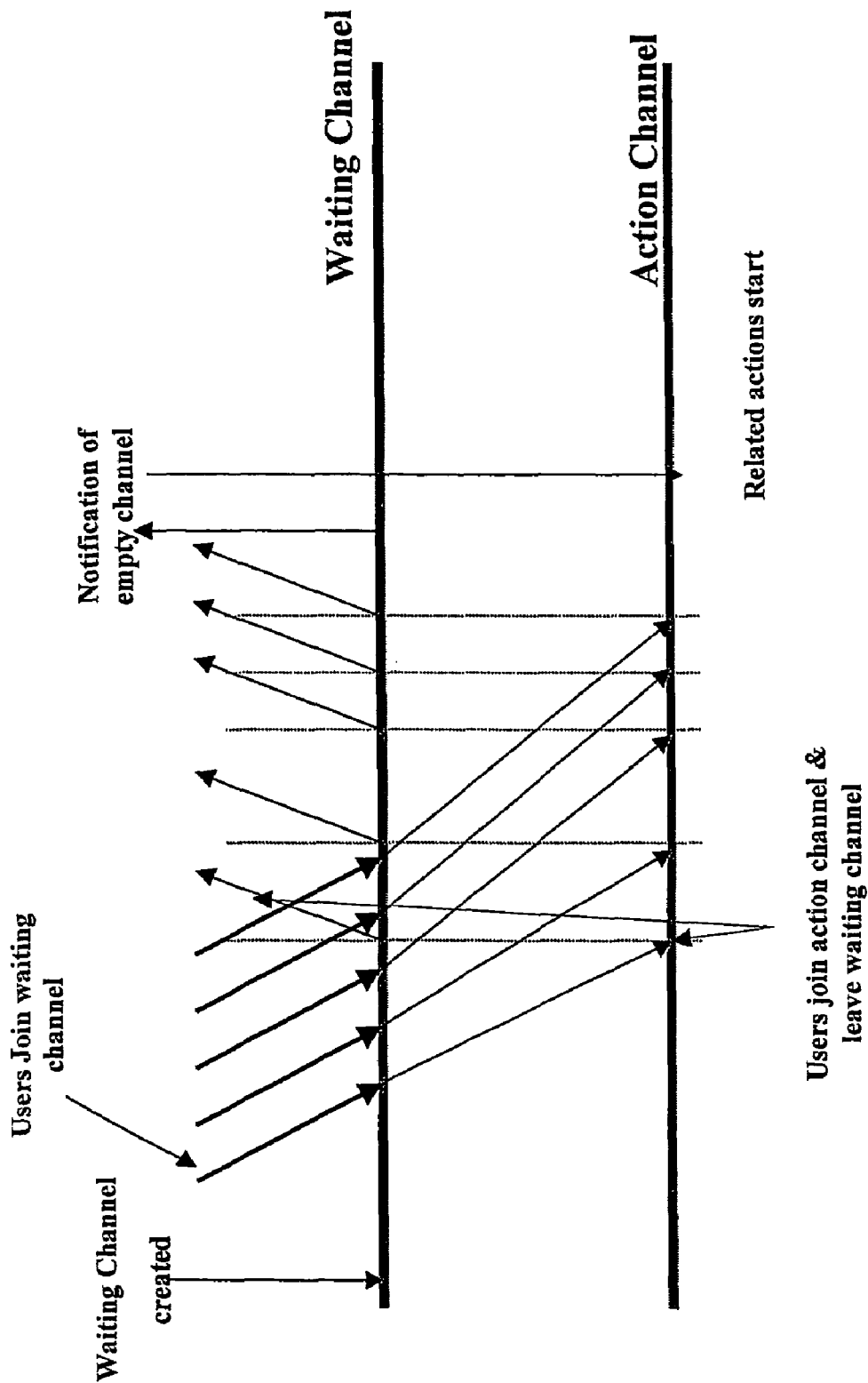
FIG. 6 is a timing diagram illustrating the membership of a waiting channel in an embodiment of the invention.

FIGS. 5 and 6 illustrate how such operation can be achieved. In this respect FIG. 6 illustrates an example timing diagram of the operation of the steps shown in FIG. 5.

Firstly, at step 5.1 a source or an administrator announces that a particular multicast group channel is allocated to control a particular action (in the case of the first embodiment, the action is a video transmission), and designates a waiting channel for the action. At step 5.2 an action channel for the action is also allocated. An action could be for example a communication session delivered over several multicast channels. At least the waiting channel is managed with MSNIP or a similar protocol, but the action channel may also be so managed. At this time as no receivers are joined to either channel the source would receive MSNIP "hold" messages from the IGMP routers for each channel which is MSNIP managed.

Having designated the wait and action channels, any receivers interested in the particular action then join the wait channel, at step 5.3. Once a single receiver has joined the wait channel the first-hop IGMP router transmits a "transmit" message to the source, in accordance with MSNIP. Whilst joined to the wait channel the receivers perform an action or process, such as, in the present example, preparing to receive data on the action channel. Once an individual receiver has prepared itself for the action to occur on the action channel it leaves the wait channel and joins the action channel, at step 5.4. Once a single receiver has left the wait channel and joined the action channel the source will receive a "transmit" message from the first-hop IGMP router on the action channel.

In the meantime, at step 5.5 the source monitors the wait channel for MSNIP messages from the first-hop IGMP router in respect of that channel. No further messages will be received, however, until all of the receivers have prepared themselves for data receipt and have left the waiting channel at step 5.6. At this point, the first-hop IGMP router sends an MSNIP "hold" message to the source in respect of the waiting channel, which indicates to the source that all of the receivers have left the wait channel, and hence must be ready to receive on the action channel. In this way co-ordination between the source and a potentially large number of receivers can be obtained without massive signalling overheads, and without the source having to store the state of every receiver. This provides for scalability and privacy, as synchronisation may be achieved between different sources without having to exchange any identity information.

Once a "hold" message has been received on the wait channel the source is then free to perform an action or process on the action channel. Within the first embodiment this is to transmit video data on the action channel, although of course the invention is not limited to such an action, and any other action or process which is required may be performed. Moreover, in further embodiments, the entity on the source side exploiting the co-ordination process provided by the invention does not have to be the source of the action or process; it could be just an independent part in the process that signals to one or more sources when the process should be started. That is, the action or process performed may be to just indicate to another process, entity, or to a human user that co-ordination has been achieved.

A second embodiment which illustrates how the invention may be used in supply chain management or project management will now be described with respect to FIG. 7.

Figure 7:
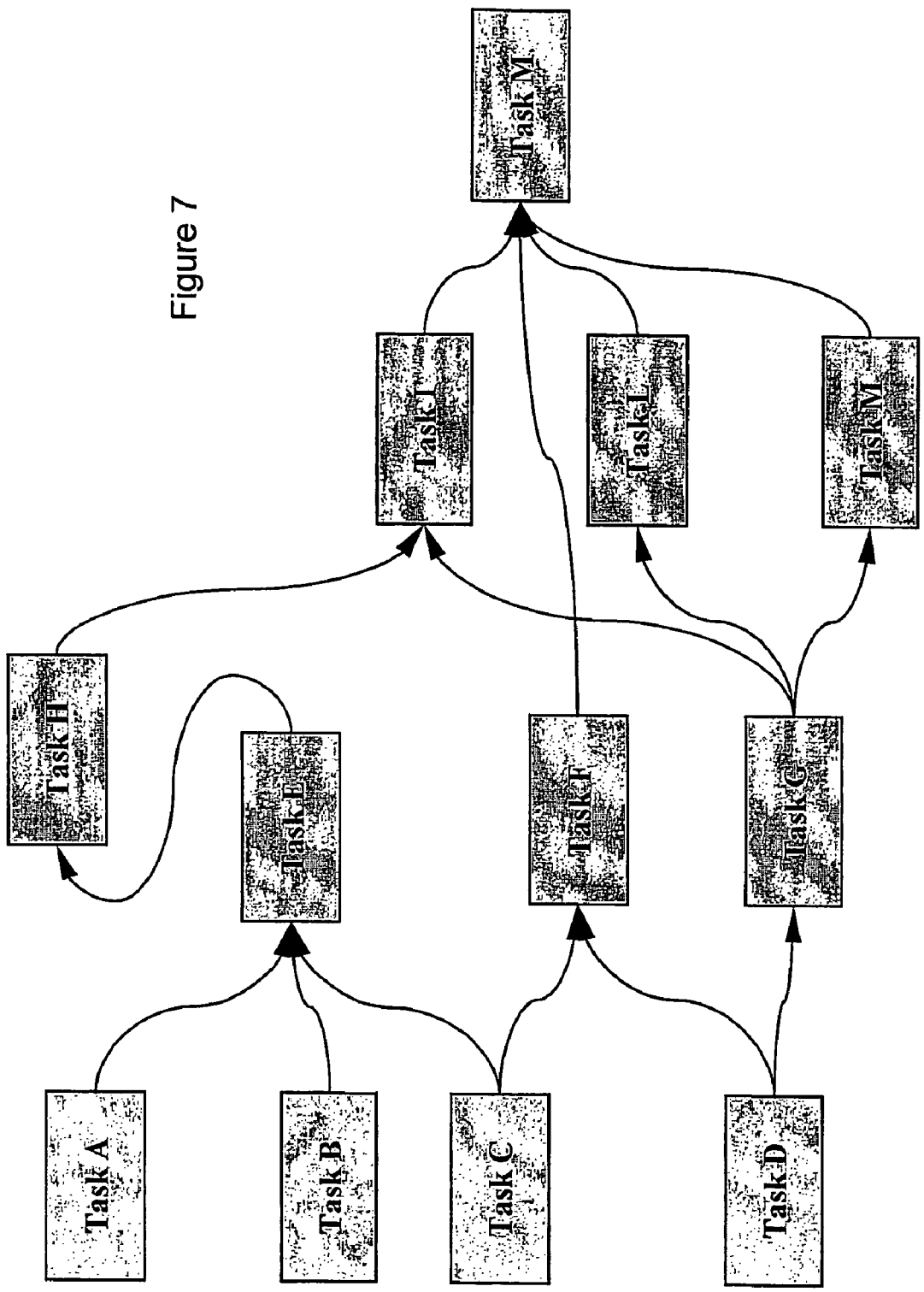
FIG. 7 is a task flow diagram illustrating tasks to be performed in another embodiment of the invention.

FIG. 7 illustrates a number of tasks which need to be completed within a given project, and the interrelationships between each task which govern the order in which they need to be completed. As an example, consider task E. Here, it will be seen that task E needs to be completed serially after all of tasks A, B, and C have finished, but that tasks A, B, and C may themselves be conducted in parallel (with task D, in addition). Another example is Task I, which must be completed serially after Tasks G and H have completed, but may be completed in parallel with Tasks L and M.

It is important to note here that the tasks illustrated in FIG. 7 may be almost any task. For example, the overall process shown in FIG. 7 might relate to the design of a new building or aircraft, or to the manufacture of a new car. Alternatively the tasks might relate to the various computations and processes which need to be executed by distributed computers in running a given program. Many other actions, or processes may also be included.

It is possible to apply the present invention to the above scenario to achieve co-ordination between the various tasks as follows. As an example consider task E. Here, a task manager for task E uses a network enabled device to access a network and to allocate a multicast waiting channel for task E. The waiting channel is managed by MSNIP or a similar type of protocol. Task managers for each of tasks A, B, and C which need to be completed before task E then each respectively also use a network enabled device to join to the allocated waiting channel for task E for the respective durations which it takes for the respective tasks A, B, and C to be performed. The task E manager then monitors the waiting channel for an MSNIP "hold" message, which indicates that all of the task managers A, B, and C have left the waiting channel. Once a particular one of the tasks A, B, and C has been completed, the task manager for the completed task controls the network enabled device to leave the waiting channel for task E. Once the last of the tasks has been completed and all of the task managers have left the waiting channel, an MSNIP "hold" message is generated and sent to the task E manager, who then knows that as tasks A, B, and C have finished, he may start task E. Thus co-ordination is achieved between tasks A, B, and C and task E with a minimum of communications therebetween.

The above idea is extendable to the entire project by every task manager whose task requires an earlier task to be performed creating an MSNIP (or similar) managed wait channel. Then, the task managers for the respective earlier tasks join the appropriate wait channels for the periods before and during their tasks are being performed, and then leave the wait channels once their task has been completed. In this way, co-ordination between multiple tasks across a whole project may be maintained with extremely low signalling overheads—essentially, only the MSNIP "transmit" and "hold" messages will be sent once on each wait channel.

Of course, the task managers may be implemented as software agents running on a computer or may be human users controlling a network enabled device to join to the appropriate wait channels. More particularly by the term "task manager" we intend to encompass, inter alia, both real humans, and also software applications or other devices acting as a task manager. For example, it is readily possible to envisage a software agent program which is able to act as a task manager for a given task. Moreover depending upon the technical field of application of the invention the task manager may be exclusively software—for example, where the tasks are processes to be performed in a distributed computing environment, the task managers will invariably be software processes.

The above described embodiments are efficient in terms of network usage and time synchronization, but may be open to problematic operation if the participants do not comply to the specification of the protocol. As an example if all of the receivers leave a waiting channel but a "hold" notification message is not sent to the waiting channel then the method will fail.

Additionally, there is a simple Denial of Service problem that a user could provoke joining random channels which are MSNIP managed and then not leave the waiting group channel. Solutions against this attack consist in forcing users to leave the channel by using for example an abort message when the waiting channel does not empty for too long, and also by controlling the join operation. This problem becomes more important if we consider implementing our mechanism using multicast channel in an open domain such as the Internet. In this case an access control protocol for multicast communication is required. The actual multicast network does not provide any method to guarantee that an undesired or malicious user is prevented from gaining access to a particular multicast tree.

In order to address this problem, in a third embodiment we provide a solution to this problem by implementing a secure version of the IGMP protocol implemented in the access router. Here, a host's IGMP requests need to be authenticated before a router triggers the multicast routing protocol. This gives liability to edge routers for each host they accept. In order to extend such a mechanism to the co-ordination techniques of the present invention we associate to each receiver application which wishes to participate in a group communication a key message. A receiver application is then only allowed to join a waiting channel if it is able to authenticate itself by passing to the IGMP router the correct information.

By exploiting such a mechanism we are able to protect against malicious join events (a malicious join event being by a malicious user who has no intention of leaving the waiting channel, hence effectively performing a Denial of Service attack on the other receivers), however this technique may still liable to DoS attacks if a receiver application which is able to authenticate itself still does not leave the waiting channel i.e. even though the identity of the receiver is known, the receiver still does not leave the waiting channel, and hence no "hold" message is sent thereon to indicate to the source that all of the receivers have left the wait channel.

Figure 8:
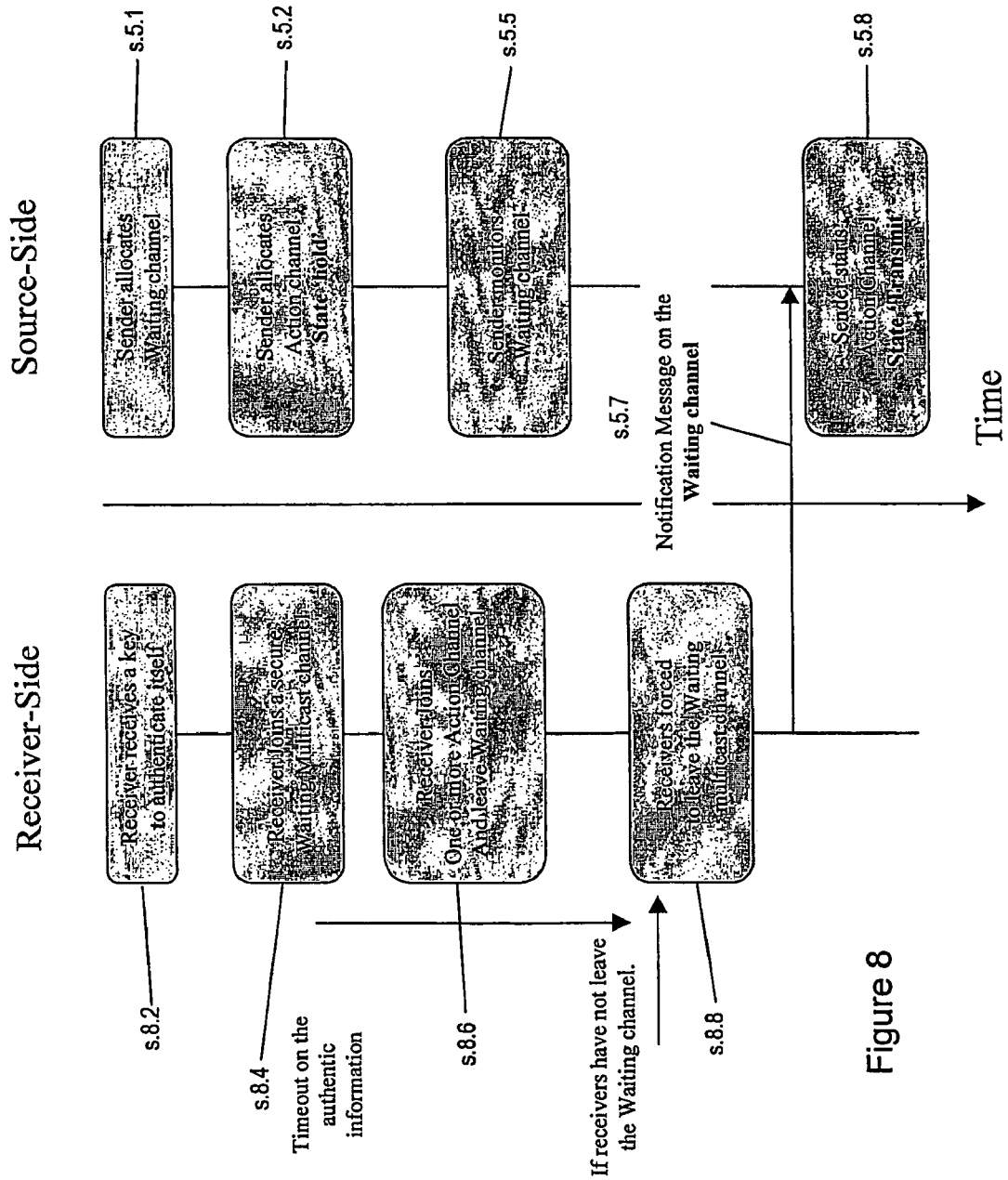
FIG. 8 is a flow diagram illustrating the actions performed by receivers and a source in a further embodiment of the invention.

In order to get around this problem within the third embodiment we further associate to each key a timeout, so that a user joining an IGMP router will be able to stay connected until the key validity expires. When the key expires the router automatically disconnects the user from the group. The same mechanism can also be used to force an action on an action channel to start even if members are not ready and it is similar to installing a time-out on the waiting channel. In FIG. 8 we show how the overall process has to be modified to take into account the possibility of malicious users connecting to the wait channel and thereafter not leaving.

As will be seen, the steps performed on the source side are identical to those previously described in respect of the first embodiment, to which the reader is referred. However, at the receiver side at step 8.2 a receiver must first receive a key with which it may authenticate itself to the IGMP edge router at which it is trying to access a wait channel. Then, in order to access the wait channel at step 8.4 receivers have to pass authenticated information (a secure key) to get access to the waiting channel. Upon each receiver joining the wait channel a timer is started at the IGMP edge router which the user accessed giving each receiver the time to join the action channel and to leave the waiting channel as the protocol of the invention describes. The receivers may then leave the wait channel and join the action channel at step 8.6 during the timer period, but otherwise, if a receiver has not left the wait channel after the timer period the IGMP router disconnects the receiver from the channel, at step 8.8. Once all of the receivers have either left the channel voluntarily or been automatically disconnected, then a "hold" message can be sent on the wait channel indicating that it is now clear. The source application may then take whatever action or perform whatever process the wait channel was set up for.

Within the embodiments described above we have generally made reference to there being a single wait channel per action or process to be performed, but of course this need not be the case, and in other embodiments of the invention multiple wait channels may be provided for a particular action. By providing multiple wait channels additional "bits" of information may be provided to the source by the IGMP routers, by the receivers joined to a plurality of wait channels choosing to leave certain of the wait channels, but not others. For example, in the case of a video conference a source may designate two or more wait channels, with one channel indicating to the source that all of the receivers are ready to receive video data, and the second channel indicating to the source that all of the receivers are ready to transmit data. Other uses of multiple wait channels will be apparent to those skilled in the art.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

What is claimed is:

1. A method for co-ordinating a group of members, the group comprising a first member and one or more other members, each member being arranged to communicate with the other members of the group via a network, the method comprising, at the first one of said group members:
    monitoring at least one waiting channel for messages indicating that at least one of the one or more other members are joined to the waiting channel, said waiting channel relating to an action or process to be performed;
    determining from said monitoring if all of the other members have left the waiting channel; and
    commencing said action or process in the event that it is determined as a result of said monitoring that all of the other members have left the waiting channel,
    wherein said action or process to be performed comprises transmitting data onto one or more other channels.

2. A method according to claim 1, wherein at least one of the one or more other channels is a multicast channel.

3. A method according to claim 1, wherein the data is audio and/or video data.

4. A method according to claim 1, wherein the action or process is to perform a predetermined task.

5. A method according to claim 1, wherein in the case of there being a plurality of other members the waiting channel is a multicast channel.

6. A method according to claim 1, wherein the messages are generated by a network router.

7. A method according to claim 1, wherein the messages are Multicast Source Notification of Interest Protocol (MSNIP) messages.

8. A method according to claim 1, and further comprising the announcing which channel is the waiting channel to the one or more other members.

9. A computer-readable storage medium or media storing a computer program or suite of programs so arranged such that when executed by a computer system the program or programs cause the computer system to operate according to the method of claim 1.

10. A device arranged to co-ordinate with one or more other devices, each device being arranged to communicate via a network, the device comprising:
    channel monitoring means arranged in use to monitor at least one waiting channel for messages indicating that at least one of the one or more others of said devices are joined to the waiting channel, said waiting channel relating to an action or process to be performed and to determine from monitoring said waiting channel if all of the other members have left the waiting channel; and
    means for performing an action or process so arranged such that in the event that it is determined as a result of monitoring performed by said channel monitoring means waiting channel that all of the other devices have left the waiting channel, the means for performing an action or process commences said action or process,
    wherein the means for performing an action or process comprises data transmission means arranged in use to transmit data onto on or more other channels.

11. A device according to claim 10, wherein at least one of the one or more other channels is a multicast channel.

12. A device according to claim 10, wherein the data is audio and/or video data.

13. A device according to claim 10, wherein the means for performing an action or process are further arranged in use to perform a predetermined task.

14. A device according to claim 10, wherein in the case of there being a plurality of other devices and the waiting channel being a multicast channel, said channel monitoring means is for monitoring such a multicast channel.

15. A device according to claim 10, wherein the channel monitoring means is arranged to monitor said at least one waiting channel for messages generated by a network router.

16. A device according to claim 10, wherein the messages are Multicast Source Notification of Interest Protocol (MSNIP) messages.

* * * * *